(No Model.)
J. MEŸENBERG.
APPARATUS FOR PRESERVING MILK.
No. 308,421. Patented Nov. 25, 1884.
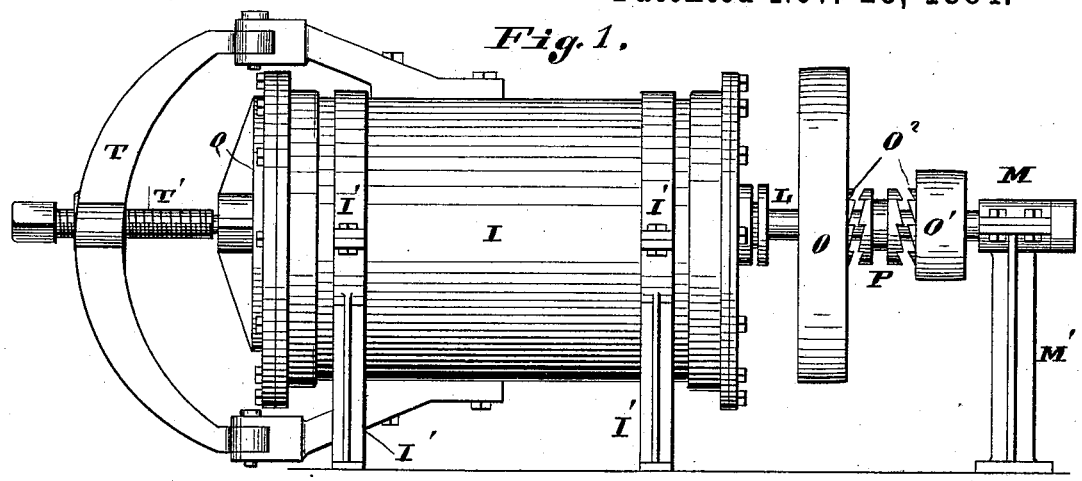
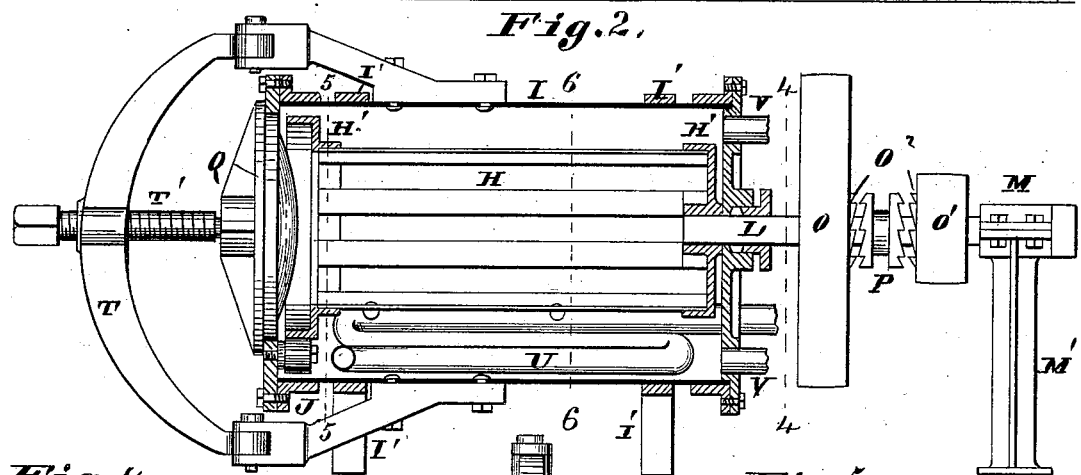
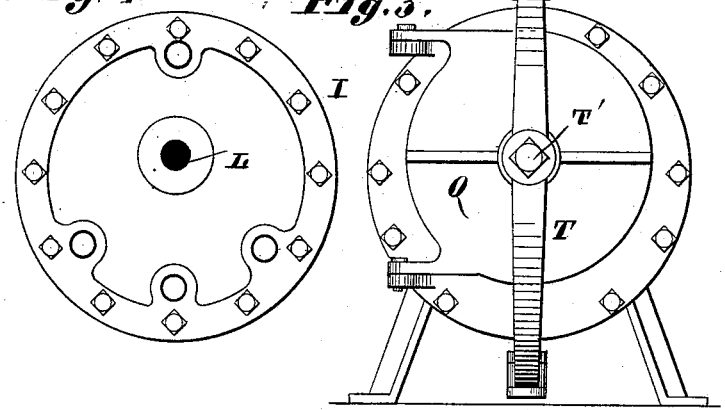
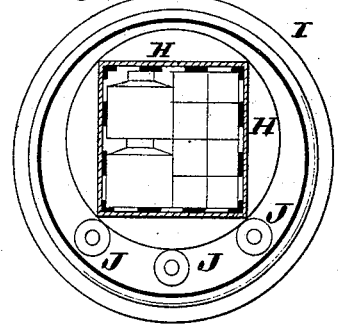
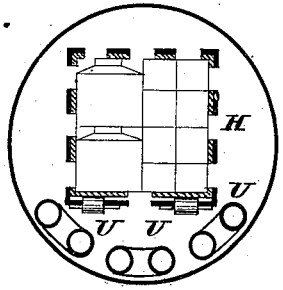
Attest:
Charles Pickles
Geo. L. Wheelock
Inventor:
Jno. Meyenberg
By Knight Bros
Attys

UNITED STATES PATENT OFFICE.

JOHN MEŸENBERG, OF ST. LOUIS, MISSOURI.

APPARATUS FOR PRESERVING MILK.

SPECIFICATION forming part of Letters Patent No. 308,421, dated November 25, 1884.

Application filed February 16, 1884. (No model.)

*To all whom it may concern:*

Be it known that I, JOHN MEŸENBERG, of the city of St. Louis, in the State of Missouri, have invented a certain new and useful Improvement in Apparatus for Preserving Milk, of which the following is a full, clear, and exact description, reference being had to the accompanying drawings, forming part of this specification, and in which—

Figure 1 is a side view of the condenser. Fig. 2 is a longitudinal section of same. Fig. 3 is an end view. Fig. 4 is a transverse section taken on line 4 4, Fig. 2. Fig. 5 is a similar view taken on line 5 5, Fig. 2, and Fig. 6 is a similar view taken on line 6 6, Fig. 2.

The milk is put into cans of desired sizes, which are hermetically sealed and placed in a frame, H, (see Figs. 2 and 5,) which consists of bars connected by heads H'. This frame is inclosed by a cylinder, I, held in supports I'. One end of the frame is supported within the cylinder on friction-rollers J, journaled in one head of the cylinder. (See Fig. 2.) The other end of the frame is supported on one end of a driving-shaft, L, passing through the other head of the cylinder. The outer end of the shaft is supported in a journal-box, M, on a standard, M'. On this shaft are two loose driving-pulleys, O O', one of them being large and the other small, and both of them being provided with notches or teeth $O^2$, to engage a sliding clutch, P, arranged to turn with the shaft. Both pulleys are provided with driving-belts, and by connecting one or the other of them to the shaft by the sliding clutch the frame H may be turned fast or slow, as desired. The frame H can be removed from the cylinder, to be filled with cans, through an opening which can be closed by a door, Q, held in place by a swinging frame, T, and a screw, T'. The interior of the cylinder may be heated by steam passing through pipe or pipes U, and may be cooled by air entering through pipes V. Before the cans are placed in the frame H they are immersed in water and the milk cooled to a temperature of about 35°. The milk may be put into open cans and cooled off and then be put into tight cans, as stated. The tight cans should not be quite filled with the milk, so that the milk can move when the frame H is turned. It is better that the cans should have very little, if any, contact one with another in the frame H. When the cans are put in the frame and the cylinder closed, the frame being supported within the cylinder, as shown in Fig. 2, steam is admitted to the pipe or pipes U, heating the interior of the cylinder. The frame is simultaneously turned slowly, about two or three revolutions per minute. This is continued about thirty minutes, (the temperature should not exceed 218° to 228°,) and then the steam is turned off and the pipe or pipes U cooled by water being passed through them or it. At the same time air is admitted to the interior of the cylinder through the pipes V. The frame is then turned quickly for fifteen minutes, more or less, during which time the milk is cooled to a temperature of 25° or 30°. The cans are then taken out and examined to see if there is any leakage, which will show whether or not they were hermetically sealed. The cans can then be stored away and the milk will keep good for years.

I claim as my invention—

1. The combination of the revolving frame adapted to receive cans, the outer inclosing-cylinder, and the air and steam pipes, arranged and operating substantially as and for the purpose set forth.

2. The combination of the revolving frame H, cylinder I, surrounding the frame, steam-pipes U within the cylinder beneath the frame, air-pipes entering one end of the cylinder, and a door at the other end of the cylinder, through which the frame passes, as set forth.

JOHN MEŸENBERG.

In presence of—
GEO. H. KNIGHT,
SAML. KNIGHT.